United States Patent
Facci et al.

(10) Patent No.: US 7,462,661 B2
(45) Date of Patent: Dec. 9, 2008

(54) RELEASE FLUID ADDITIVES

(75) Inventors: John S. Facci, Webster, NY (US); William H. Wayman, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 296 days.

(21) Appl. No.: 11/184,692

(22) Filed: Jul. 19, 2005

(65) Prior Publication Data

US 2007/0019988 A1  Jan. 25, 2007

(51) Int. Cl.
*C08K 5/3415* (2006.01)

(52) U.S. Cl. .................. 524/89; 524/588; 524/239; 524/238; 524/379; 524/392; 524/249; 106/287.11; 106/287.14; 252/182.3; 252/182.12

(58) Field of Classification Search .......... 524/89, 524/239, 238, 379, 392, 249; 106/287.11, 106/287.14; 252/182.3, 182.12
See application file for complete search history.

(56) References Cited

U.S. PATENT DOCUMENTS

| | | | |
|---|---|---|---|
| 3,804,620 A * | 4/1974 | Wells | 430/38 |
| 4,029,827 A | 6/1977 | Imperial et al. | |
| 4,045,695 A * | 8/1977 | Itagaki et al. | 310/322 |
| 4,046,795 A * | 9/1977 | Martin | 556/429 |
| 4,089,785 A * | 5/1978 | Johnson | 252/608 |
| 4,101,686 A | 7/1978 | Strella et al. | |
| 4,146,659 A | 3/1979 | Swift et al. | |
| 4,185,140 A | 1/1980 | Strella et al. | |
| 4,257,699 A | 3/1981 | Lentz | |
| 4,264,181 A | 4/1981 | Lentz et al. | |
| 4,269,741 A * | 5/1981 | Homan | 524/588 |
| 4,272,179 A | 6/1981 | Seanor | |
| 4,515,884 A | 5/1985 | Field et al. | |
| 4,612,055 A * | 9/1986 | Manis et al. | 106/287.11 |
| 4,639,321 A * | 1/1987 | Barrat et al. | 510/328 |
| 4,784,795 A * | 11/1988 | Fahl | 508/201 |
| 5,147,567 A | 9/1992 | Agarwala et al. | |
| 5,356,549 A * | 10/1994 | Takahashi et al. | 508/136 |
| 5,395,725 A | 3/1995 | Bluett et al. | |
| 5,401,570 A | 3/1995 | Heeks et al. | |
| 5,493,376 A | 2/1996 | Heeks | |
| 5,512,409 A | 4/1996 | Henry et al. | |
| 5,516,361 A | 5/1996 | Chow et al. | |
| 5,531,813 A | 7/1996 | Henry et al. | |
| 5,847,034 A * | 12/1998 | Achenbach et al. | 524/91 |
| 6,159,588 A | 12/2000 | Eddy et al. | |
| 6,808,814 B2 | 10/2004 | Kaplan et al. | |
| 6,808,815 B2 | 10/2004 | Kaplan et al. | |
| 6,829,466 B2 | 12/2004 | Finn et al. | |
| 6,830,819 B2 | 12/2004 | Kaplan et al. | |

* cited by examiner

*Primary Examiner*—Margaret G Moore
(74) *Attorney, Agent, or Firm*—Pillsbury Winthrop Shaw Pittman LLP

(57) ABSTRACT

The presently disclosed embodiments are directed to release fluids or agents that are useful in release coating in toner-based technologies. More particularly, the embodiments pertain to the addition of metal chelating agents to release fluids to prevent byproduct reactions from the fusing process that would otherwise decrease fuser member life and image quality.

6 Claims, 1 Drawing Sheet

RELEASE FLUID ADDITIVES

BACKGROUND

The presently disclosed embodiments are directed to release fluids or agents that are useful in release coating in toner-based technologies. More particularly, the embodiments pertain to the addition of metal chelating agents to release fluids to improve the fuser member life, especially in fusing systems that involve toners with zinc stearate additives.

In electrostatographic reproducing apparatuses, including digital, image on image, and contact electrostatic printing apparatuses, a light image of an original to be copied is typically recorded in the form of an electrostatic latent image upon a photosensitive member and the latent image is subsequently rendered visible by the application of electroscopic thermoplastic resin particles and pigment particles, or toner. The residual toner image can be either fixed directly upon the photosensitive member or transferred from the member to another support, such as a sheet of plain paper with subsequent fixing or fusing.

In order to fix or fuse the toner material onto a support member permanently by heat, it is usually necessary to elevate the temperature of the toner material to a point at which the constituents of the toner material coalese and become tacky. This heating action causes the toner to flow to some extent into the fibers or pores of the support member. Thereafter, as the toner material cools, solidification of the toner material causes the toner material to be bonded firmly to the support member.

Typically, the thermoplastic resin particles are fused to the substrate by heating to a temperature of from about 90 degrees Celsius to about 200 degrees Celsius or higher, depending on the softening range of the particular resin used in the toner. It may be undesirable, however, to increase the temperature of the substrate substantially higher than about 250 degrees Celsius because the substrate may discolor or convert into fire at such elevated temperatures, particularly when the substrate is paper.

Several approaches to thermal fusing of electroscopic toner images have been described. These methods include providing the application of substantial heat and pressure concurrently by various means, including fuser members such as a roll pair maintained in pressure contact, a belt member in pressure contact with a roll, a belt member in pressure contact with a heater, and the like. Heat can be applied by heating one or both of the rolls, plate members, belt members, or the like. The fuser member can be in the form of a roller, drum, belt, sheet, film, drelt (a hybrid between a roll and a belt), and the like. The fusing of the toner particles occurs when the proper combination of heat, pressure, and/or contact for the optimum time period are provided. The balancing of these variables to bring about the fusing of the toner particles can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affect the fusing of the toner image onto the support. It is important that minimal or no offset of the toner particles from the support to the fuser member takes place during normal operations. Toner particles that offset onto the fuser member can subsequently transfer to other parts of the machine or onto the support in subsequent copying cycles, increasing the image background, and causing degraded copy quality, inferior marks on the copy, interference with the material being copied, and toner contamination of other parts of the machine. Such problems, known as "hot offset," occur when the temperature of the toner is increased to a point where the toner particles liquefy and a splitting of the molten toner takes place with a portion remaining on the fuser member. The hot offset temperature or degradation of the hot offset temperature directly impacts the release properties of the fuser member. Accordingly, it is desirable to provide a fusing surface with low surface energy to provide the necessary release. To ensure and maintain good release properties of the fuser member, release agents may be applied to the fuser member during the fusing operation to prevent toner offset.

U.S. Pat. No. 4,257,699 to Lentz, the subject matter of which is hereby incorporated by reference in its entirety, discloses a fuser member comprising at least one outer layer of an elastomer containing a metal-containing filler and use of a polymeric release agent.

U.S. Pat. No. 4,264,181 to Lentz et al., the subject matter of which is hereby incorporated by reference in its entirety, discloses a fuser member having an elastomer surface layer containing metal-containing filler therein and use of a polymeric release agent.

U.S. Pat. No. 4,272,179 to Seanor, the subject matter of which is hereby incorporated by reference in its entirety, discloses a fuser member having an elastomer surface with a metal-containing filler therein and use of a mercapto-functional polyorganosiloxane release agent.

U.S. Pat. No. 5,401,570 to Heeks et al., the subject matter of which is hereby incorporated by reference in its entirety, discloses a fuser member comprised of a substrate and a silicone rubber surface layer over the substrate containing a filler component, wherein the filler component is reacted with a silicone hydride release agent.

U.S. Pat. No. 4,515,884 to Field et al., the subject matter of which is hereby incorporated by reference in its entirety, discloses a fuser member having a silicone elastomer-fusing surface, which is coated with a toner release agent, which includes an unblended polydimethyl siloxane.

U.S. Pat. No. 6,159,588 to Eddy et al., the subject matter of which is hereby incorporated by reference in its entirety, discloses a fuser member comprised of a substrate, and a thermally conductive fusing layer.

U.S. Pat. No. 6,808,814 to Kaplan et al., the subject matter of which is hereby incorporated by reference in its entirety, discloses a fuser member having a substrate, an outer polymeric layer; and a combination of a fluorosilicone release agent and a functional polydimethylsiloxane release agent having amino, mercapto, hydride, carboxy, and/or other functionality.

Certain toner formulations rely on zinc stearate additive for tribo stability and lubrication. However, addition of zinc substantially shortens fuser member life, increases running costs and therefore significantly constrains profitability. The problem arises because zinc reacts with the trace fumarate remaining from the synthesis of the toner resin, causing the fumarate to precipitate on the fuser member. The precipitation increases the viscosity of the release fluid and shortens roll life by interfering with toner release.

Thus, there remains a need for preventing metal ions, such as zinc, from reacting with toner process byproducts and interfering with toner release and degrading image quality.

SUMMARY

According to aspects illustrated herein, there is provided an improved release fluid or agent that includes a zinc chelating agent. Metal chelating agents bind offending metal ions, such as zinc, and are widely used in different industries (for example, water treatment, biomedical, health and food industries, and in chemical synthesis, and the like). The metal chelating agents will substantially prevent metal ions present in the toner from reacting with toner process byproducts and thus prevent disruption of the fusing process. For example, a zinc chelating agent can bind the zinc present in the toner and prevent its reaction with fumarate.

An embodiment may include: a fuser member comprising a substrate; an outer layer covering the substrate; and a release coating on the outer layer, wherein the release coating includes zinc chelating agents, such as mono- or multi-dentate aliphatic amines, mono- or multi-dentate aliphatic thiols, or chelating agents based on aliphatic and aromatic substituted porphyrins and phthalocyanines. The general formula for suitable porphyrin and phthalocyanine chelating agents is shown below where R=C1-C18 alkyl substituent, a phenyl group or an alkylated phenyl group.

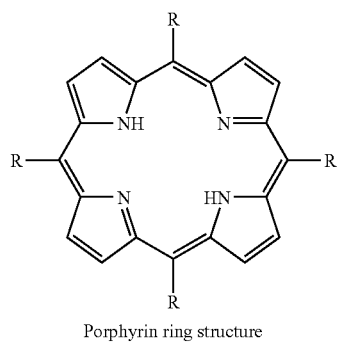

Porphyrin ring structure

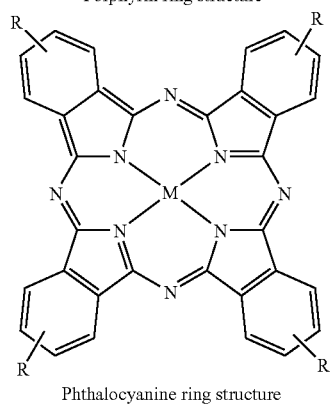

Phthalocyanine ring structure

In embodiments, the outer layer may be selected from the group consisting of a silicone elastomer, a fluorosilicone elastomer, a fluoroelastomer, a fluorinated hydrocarbon polymer, a fluorinated hydrocarbon and silicone polymer blend, silicone copolymers, and crosslinked blends of fluorinated hydrocarbon copolymers and silicone copolymers.

Another embodiment may further include: an image forming apparatus for forming images on a recording medium comprising a charge-retentive surface to receive an electrostatic latent image thereon; a development component to apply a developer material to the charge-retentive surface to develop the electrostatic latent image to form a developed image on the charge retentive surface; a transfer component to transfer the developed image from the charge retentive surface to a copy substrate; and a fuser member component to fuse the transferred developed image to the copy substrate, wherein the fuser member comprises: a substrate; an outer layer covering the substrate; and a release coating on the outer layer, wherein the release coating includes a zinc chelating agent. Again, the composition of the outer layer may be selected from the group consisting of a silicone elastomer, a fluorosilicone elastomer, a fluoroelastomer, a fluorinated hydrocarbon polymer, a fluorinated hydrocarbon and silicone polymer blend, silicone copolymers, and crosslinked blends of fluorinated hydrocarbon copolymers and silicone copolymers. The release coating may include a variety of zinc chelating agents, including mono- or multi-dentate aliphatic amines, mono- or multi-dentate aliphatic thiols, or chelating agents based on aliphatic and aromatic substituted porphyrins and phthalocyanines, as indicated above.

In embodiments, an outer layer comprising a fluoroelastomer may further be selected from the group consisting of 1) copolymers of two of vinylidene fluoride, hexafluoropropylene and tetrafluoroethylene; 2) terpolymers of vinylidene fluoride, hexafluoropropylene and tetrafluoroethylene; and 3) tetrapolymers of vinylidene fluoride, hexafluoropropylene, tetrafluoroethylene, and a cure site monomer.

BRIEF DESCRIPTION OF THE DRAWINGS

For a better understanding of the present invention, reference may be had to the accompanying figures.

DETAILED DESCRIPTION

Figure 1:
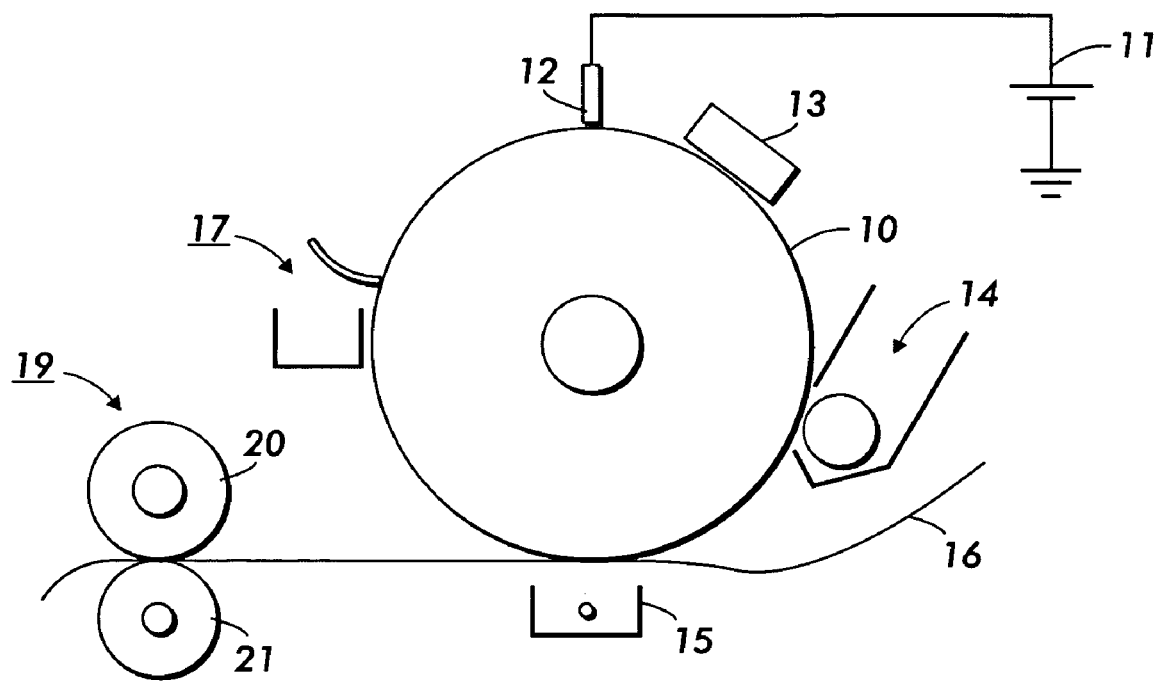
FIG. 1 is a schematic illustration of an image apparatus in accordance with the invention.

In the following description, reference is made to the accompanying drawings, which form a part hereof and which illustrate several embodiments of the present invention. It is understood that other embodiments may be utilized and structural and operational changes may be made without departure from the scope of the present invention.

Embodiments of the present invention relate to fuser members having a release agent in combination therewith. The fuser member can be in the form of a roller, drum, belt, sheet, film, drelt (a hybrid between a roll and a belt), and the like. The fuser member may have an outer layer in combination with a release fluid or agent including a metal chelating agent. In other embodiments, high temperature stable chelating agents will be able to bind to offending metal ions, such as zinc, despite the high temperatures in the fusing system. The combination, in embodiments, allows for use of toners with zinc, without precipitation in the presence of the fumarate, and thus, increased fuser member life without interference with toner release results.

Many chelating agents are known to react with specific metal ions, sequestering them from undesirable sites as well as preventing unwanted precipitation reactions. Ethylenediaminetetraacetic acid (EDTA) and similar variants are used, for example, to de-toxify the body of heavy metals such as mercury, cadium and copper. Other similar chelating agents are used in water treatment either as a food additive or to prevent scale build-up from water hardness and iron contamination. Chelating agents can also be used to increase solubility of metals that are generally in an insoluble form.

Metal chelating agents work by chemically surrounding the offending metal ion by binding at multiple coordination sites. The binding leads to solubilization of the metal ion, so that it can removed. For example, in the body, the solubilization allows the ion to be flushed from the body, or in water treatment, the solubilization prevents the ion from depositing into scale on the interior of pipes.

In one aspect of the embodiments, a zinc chelating agent is added to release fluid to sequester the zinc present in a toner. The zinc chelating agent will prevent the zinc in the toner from reacting with the toner process byproduct, fumarate. Because the reaction between zinc and fumarate normally causes the fumarate to precipitate, the viscosity of the release fluid involved is increased which limits roll or belt life and image quality by interfering with the release. By including a metal chelating agent in the release fluid, however, the amount of metal free in the toner to react with toner process byproducts is reduced. For example, when using a release fluid that includes a zinc chelating agent, such as meso-tetraphylporphyrin (TPP) or ethylenediaminetetraacetic acid (EDTA), the amount of free zinc ion present in the fusing process may be reduced by about a factor of 100. Thus, by including the zinc chelating agent in the release fluid or agent, the fuser member life and good release may be substantially improved and maintained longer than without the agent.

To sufficiently bind zinc ions, a chelating agent should possess several properties. These properties include: ability to react irreversibly with zinc at a high stability constant, solubility in fairly non-polar siloxane at room temperature at the required concentration, stability at high temperature, inability to interfere with the release fluid's amino functionality, inability to bind to other agents at the fuser member surface, and inability to change the physical properties of the release fluid. Embodiments of the present invention are comprised of one or a combination of zinc chelating agents that have one or more of these characteristics.

A partial list of agents that are good candidates for being included in a zinc chelating agent includes: TPP, metal-free phthalo-cyanine variants, EDTA, diethylenetriaminepentacetic acid (DTPA), N-(hydroxyethyl)ethylenediaminetetraacetic acid (HEDTA), nitrilotriacetic acid (NTA), sodium diethanolglycine (EIMA), 2,3-dimercaptosuccinic acid HOOCCH(SH)CH(SH)COOH (DMSA), dimercaprol $HOCH_2CH(SH)CH_2SH$ (oil soluble), aminoethylethanolamine $NH_2CH_2CH_2NHCH_2CH_2OH$ (AEEA), triethylenetetramine $H_2NCH_2CH_2NHCH_2CH_2NHCH_2CH_2NH_2$ (TETA), Dow Chemical Versene®, Dow Chemical Versenex®, and Dow Chemical Versenol®. This list is not exhaustive of all potential agents.

In one embodiment, the agent may be composed of TPP or similar variants. The TPP agent will have several advantages. U.S. Pat. No. 5,147,567 discloses that tetraphenylporphyrin is a siloxane soluble chelating agent shown to prevent corrosion in high temperature, high pressure greases for critical bearings in advanced fighter aircrafts. TPP appears to work by chelating $Fe^{2+}$ as it is formed on steel surfaces, preventing rust from forming on the bearing surfaces. TPP appears to be an ideal candidate for reacting with zinc ions as they reach the release fluid. The Zn-TPP complex is known to be stable and should itself be soluble in siloxane oil and not precipitate on the fuser member. Further, the molecular shape of TPP may prevent it from reacting with release fluid functional groups and with any copper or copper oxide at the fuser member surface. Although the cost of TPP is relatively expensive, it is not expected that high concentrations of TPP will be required to achieve the purpose stated here. In the alternative, other embodiments may use metal-free phthalocyanine variants, which behave similarly to TPP and are high temperature stable, but likely to be lower in cost.

In other embodiments, Dow Chemical's Versene®, Dow Chemical Versenex®, or Dow Chemical Versenol® may be used as the metal chelating agent. These are variants of the EDTA family of chelating agents and are known to bind irreversibly to zinc.

Referring to FIG. 1, in a typical electrostatic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor 10 is then imagewise exposed to light from an optical system or an image input apparatus 13, such as a laser and light emitting diode, to form an electrostatic latent image on the photoreceptor 10. Generally, the electrostatic latent image is developed by bringing a developer mixture from developer station 14 into contact herewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to fusing station 19, depicted in FIG. 1 as fuser roll 20 and pressure roll 21 (although any other fusing member components such as fuser belt in contact with a pressure roll, fuser roll in contact with pressure belt, and the like, are suitable for use with the present apparatus), wherein the developed image is fused to copy sheet 16 by passing copy sheet 16 between the fusing and pressure members, thereby forming a permanent image. Alternatively, transfer and fusing can be effected by a transfix application. Photoreceptor 10, subsequent to transfer, advances to cleaning station 17, wherein any toner left on photoreceptor 10 is cleaned therefrom by use of a blade (as shown in FIG. 1), brush, or other cleaning apparatus.

Figure 2:
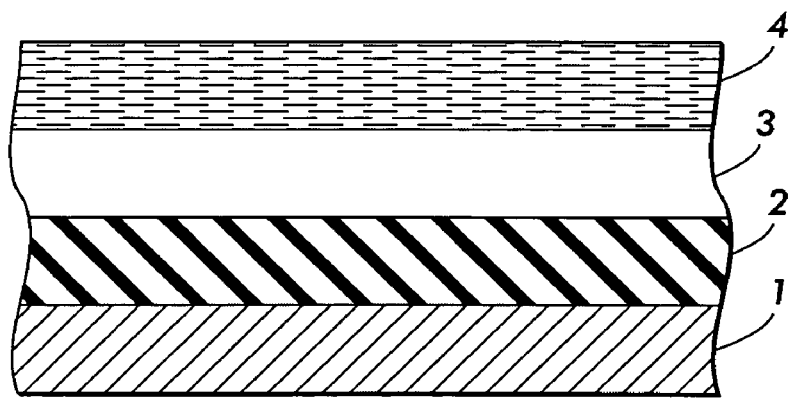
FIG. 2 is an enlarged, side view of a fuser member, showing a fuser member with a substrate, intermediate layer, outer layer, and release coating layer in accordance with an embodiment of the invention.

FIG. 2 is an enlarged schematic view of an embodiment of a fuser member, demonstrating the various possible layers. As shown in FIG. 2, substrate 1 includes an intermediate layer 2. Intermediate layer 2 can be, for example, a rubber such as silicone rubber or other suitable rubber material. On the intermediate layer 2 is positioned the outer layer 3. Positioned on the outer layer 3 is an outermost release layer 4 which includes the metal chelating agents.

The outer layer may comprise any number of compositions, including a silicone elastomer, a fluorosilicone elastomer, a fluoroelastomer, a fluorinated hydrocarbon polymer, a fluorinated hydrocarbon and silicone polymer blend, silicone copolymers, or crosslinked blends of fluorinated hydrocarbon copolymers and silicone copolymers. In an outer layer of fluoroelastomer, the fluoroelastomer may be selected from the group consisting of 1) copolymers of two of vinylidene fluoride, hexafluoropropylene and tetrafluoroethylene; 2) terpolymers of vinylidene fluoride, hexafluoropropylene and tetrafluoroethylene; and 3) tetrapolymers of vinylidene fluoride, hexafluoropropylene, tetrafluoroethylene, and a cure site monomer. The cure site monomer can be 4-bromoperfluorobutene-1, 1,1-dihydro-4-bromoperfluorobutene-1, 3-bromoperfluoropropene-1, 1,1-dihydro-3-bromoperfluoropropene-1, or any other suitable, known cure site monomer commercially available from DuPont. Specific commercial examples of fluoroelastomers include those sold under various designations as VITON A®, VITON B®, VITON E®, VITON E 60C®, VITON E430®, VITON 910®, VITON GH®; VITON GF®; and VITON ETP®. The VITON® designation is a Trademark of E.I. DuPont de Nemours, Inc. Other commercially available fluoropolymers include FLUOREL 2170®, FLUOREL 2174®, FLUOREL 2176®, FLUOREL 2177® and FLUOREL LVS 76®, FLUOREL® being a Trademark of 3M Company. Additional commercially available materials include AFLAS™ a poly(propylene-tetrafluoroethylene) and FLUOREL II® (LII900) a poly(propylene-tetrafluoroethylenevinylidenefluoride) both also available from 3M Company, as well as the Tecnoflons identified as FOR-60KIR®, FOR-LHF®, NM® FOR-THF®, FOR-TFS®, TH®, and TN505®, available from Montedison Specialty Chemical Company.

The fluoroelastomers VITON GH® and VITON GF® have relatively low amounts of vinylidenefluoride. The VITON GF® and Viton GH® have about 35 weight percent of vinylidenefluoride, about 34 weight percent of hexafluoropropylene and about 29 weight percent of tetrafluoroethylene with about 2 weight percent cure site monomer.

An inorganic particulate filler may be used in connection with the outer layer, in order to provide anchoring sites for the functional groups of the release fluid. However, a filler is not necessary for use with all fuser systems, such as one that uses fluorosilicone as the release agent.

Optional intermediate adhesive layers and/or intermediate polymer or elastomer layers may be applied to achieve desired properties and performance objectives of the present invention. The intermediate layer may be present between the substrate and the outer layer. An adhesive intermediate layer may be selected from, for example, epoxy resins and polysiloxanes. Examples of suitable intermediate layers include silicone rubbers such as room temperature vulcanization (RTV) silicone rubbers; high temperature vulcanization (HTV) silicone rubbers and low temperature vulcanization (LTV) silicone rubbers. These rubbers are known and readily available commercially such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182.

There may also be provided an adhesive layer between the substrate and the intermediate layer. There may also be an adhesive layer between the intermediate layer and the outer layer. In the absence of an intermediate layer, the outer layer may be bonded to the substrate via an adhesive layer. The thickness of the intermediate layer is from about 0.5 to about 20 mm, or from about 1 to about 5 mm.

The release fluids or agents described herein are provided onto the outer layer of the fuser member via a delivery mechanism such as a delivery roll. The delivery roll is partially immersed in a sump, which houses the release fluid or agent.

The release fluids or agents, including the zinc chelating agents, are renewable in that the release fluid or agent is housed in a holding sump and provided to the fuser member when needed, optionally by way of a release agent donor roll in an amount of from about 0.1 to about 20 mg/copy, or from about 1 to about 12 mg/copy. The system by which release fluid is provided to the fuser member via a holding sump and, optionally, a donor roll is well known. The release fluid may be present on the fuser member surface in a continuous or semi-continuous phase. The release fluid in the form of a film is in a continuous phase and continuously covers the fuser member.

Examples of suitable metal chelating agents for the release fluids include TPP or similar variants, wherein the compound is a multi-dentate amine containing aromatic molecules. In embodiments, examples of release fluids with TPP include both functional and non-functional polymeric fluid release agents having the Formula I:

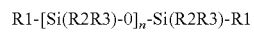

$$R1-[Si(R2R3)-O]_n-Si(R2R3)-R1$$

wherein R1 is a mercapto, amino, hydride fluoroalkyl or other suitable functionality, and R2, R3=alkyl or aryl. The mole ratio of amine to silicon atoms is from 0.03-0.2%. The mole ratio of mercapto groups to silicon atoms is from 0.05-0.5%. The release agents correspond to a viscosity of from about 100 cS to about 1000 cS, more typically from about 300 cS to about 600 cS. Because of its low concentration, the presence of chelating agents such as TPP in the release agent is not expected to significantly change the viscosity of the release agent.

Other examples of a suitable metal chelating agents include Dow Chemical's Versene®, Dow Chemical Versenex®, or Dow Chemical Versenol®. As stated above, these are variants of the EDTA family of chelating agents and are known to bind irreversibly to zinc.

The zinc chelating agent may be present in a release fluid or agent in combinations. For example, the chelating agent may be present in the release fluid or agent in amounts of from about 0.01% to about 2%. In alternative embodiments, the zinc chelating agent may be comprised of different combinations of metal chelating agents. Each combination may be composed according to the specific characteristics that are desired for a specific fusing system.

The release fluid containing metal chelating agents can also be prepared as a blend with a functional release agent such as described above or with a non-functional release agent such as polydimethylsiloxane (PDMS). A non-functional agent, as used herein, refers to a release agent that does not interact or chemically react with the surface of the fuser member or with fillers on the surface. A functional agent, as used herein, refers to a release agent having functional groups which chemically react with the fillers present on the surface of the fuser member, so as to reduce the surface energy of the fillers so as to provide better release of toner particles from the surface of the fuser member. If the surface energy is not reduced, the toner particles will tend to adhere to the fuser member surface or to filler particles on the surface of the fuser member, which will result in copy quality defects.

Preferred functional release agents include known PDMS release agents having amino-, mercapto-, hydride-, or other suitable functionality. Specific examples of suitable amino functional release agents include T-Type amino functional release agents disclosed in U.S. Pat. No. 5,516,361, monoamino functional silicone release agents described in U.S. Pat. No. 5,531,813, and the amino functional siloxane release agents disclosed in U.S. Pat. No. 5,512,409. Examples of mercapto functional release agents include those described in U.S. Pat. Nos. 4,101,686, 4,146,659, and 4,185,140. Other release agents include those described in U.S. Pat. Nos. 4,515,884 and 5,493,376.

In the above embodiments, the addition of metal chelating agents to release fluids or agents substantially eliminates the byproduct reactions from the fusing process, such as fumarate precipitation. By preventing these byproduct reactions, the release of toner is not hindered, and thus, fuser member life and image quality is maintained.

All the patents and applications referred to herein are hereby specifically, and totally incorporated herein by reference in their entirety in the instant specification.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A release fluid for coating a fuser member layer comprising polymeric functional polydimethylsiloxane (PDMS) having amino or mercapto functional groups, wherein the mole ratio of amine to silicon atoms is from about 0.03% to about 0.2% and the mole ratio of mercapto groups to silicon atoms is from about 0.05% to about 0.5%, and a metal chelating agent selected from the group consisting of meso-tetraphylporphyrin (TPP), N-(hydroxyethyl) ethylene-diaminetetraacetic acid (HEDTA), sodium diethanolglycine (EIMA), dimercaprol (oil soluble), and amino-ethylethanolamine (AEEA), wherein the release fluid is a toner release fluid and further wherein the toner release fluid chemically reacts with fillers present on the fuser member layer so as to reduce surface energy of the fillers to provide release of toner from the fuser member layer while said chelating agent substantially prevents precipitation of toner process byproducts on the fuser member layer by binding to metal ions present in the toner.

2. The release fluid of claim 1, wherein the metal chelating agent binds to zinc.

3. The release fluid of claim 1, wherein the metal chelating agent is present in an amount of from about 0.01 to about 2 percent of the release fluid.

4. The release fluid of claim 1 further including additional different metal chelating agents such that the combination of different chelating agents substantially prevents precipitation of toner process byproducts on the fuser member layer by binding to metal ions present in the toner.

5. A release fluid for coating a fuser member layer comprising:

polymeric functional polydimethylsiloxane (PDMS) having a formula of

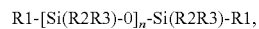

wherein R1 is a mercapto group and R2 and R3 is an alkyl or an aryl and n is a number such that a mole ratio of mercapto groups to silicon atoms is from about 0.05% to about 0.5% and the siloxane has a viscosity of from about 100 cS to about 1000 cS at room temperature; and a metal chelating agent selected from the group consisting of meso-tetraphylporphyrin (TPP), N(hydroxyethyl) ethylene-diaminetetraacetic acid (HEDTA), sodium diethanolglycine (EIMA), dimercaprol (oil soluble), and amino-ethylethanolamine (AEEA), wherein the release fluid is a toner release fluid and further wherein the toner release fluid chemically reacts with fillers present on the fuser member layer so as to reduce surface energy of the fillers to provide release of toner from the fuser member layer while said chelating agent substantially prevents precipitation of toner process byproducts on the fuser member layer by binding to metal ions present in the toner.

6. The release fluid of claim 1, wherein the metal chelating agent is meso-tetraphylporphyrin (TPP).

* * * * *